(12) United States Patent
Boyd et al.

(10) Patent No.: US 10,863,256 B2
(45) Date of Patent: Dec. 8, 2020

(54) PLUG-AND-PLAY PON SYSTEMS WITH AUTONOMOUS BOOT MODE

(71) Applicant: Tibit Communications, Inc., Petaluma, CA (US)

(72) Inventors: Edward W. Boyd, Petaluma, CA (US); Jean-Christophe B. A. Marion, Petaluma, CA (US)

(73) Assignee: Tibit Communications, Inc., Petaluma, CA (US)

(*) Notice: Subject to any disclaimer, the term of this patent is extended or adjusted under 35 U.S.C. 154(b) by 0 days.

(21) Appl. No.: 16/654,839

(22) Filed: Oct. 16, 2019

(65) Prior Publication Data

US 2020/0120408 A1 Apr. 16, 2020

Related U.S. Application Data

(60) Provisional application No. 62/746,458, filed on Oct. 16, 2018.

(51) Int. Cl.
| | |
|---|---|
| *H04B 10/00* | (2013.01) |
| *H04Q 11/00* | (2006.01) |
| *H04L 12/24* | (2006.01) |
| *G06F 9/4401* | (2018.01) |

(52) U.S. Cl.
CPC ....... *H04Q 11/0067* (2013.01); *G06F 9/4413* (2013.01); *H04L 41/082* (2013.01); *H04L 41/0886* (2013.01); *H04L 41/5054* (2013.01); *H04Q 2011/0064* (2013.01); *H04Q 2011/0081* (2013.01)

(58) Field of Classification Search
USPC .................................................. 398/66–73
See application file for complete search history.

(56) References Cited

U.S. PATENT DOCUMENTS

| | | | | |
|---|---|---|---|---|
| 6,430,687 B1* | 8/2002 | Aguilar | ................. | G06F 9/4416 710/15 |
| 7,181,142 B1* | 2/2007 | Xu | ........................ | H04J 3/1694 398/66 |
| 8,443,072 B1* | 5/2013 | Orbach | ................... | H04L 47/11 709/223 |
| 10,356,496 B2* | 7/2019 | Roe | ..................... | H04Q 11/0067 |
| 2002/0159434 A1* | 10/2002 | Gosior | ................. | H04L 1/1685 370/350 |
| 2006/0018322 A1* | 1/2006 | Oron | .................... | H04L 12/5601 370/395.1 |
| 2006/0198408 A1* | 9/2006 | Park | ........................ | H04L 41/12 372/38.02 |
| 2007/0201487 A1* | 8/2007 | Lin | ..................... | H05K 7/20009 370/395.51 |
| 2008/0232819 A1* | 9/2008 | Mukai | ..................... | H04L 47/72 398/168 |

(Continued)

*Primary Examiner* — Agustin Bello
(74) *Attorney, Agent, or Firm* — Shun Yao; Park, Vaughan, Fleming & Dowler LLP

(57) ABSTRACT

One embodiment provides a pluggable optical line terminal (OLT) in a passive optical network (PON). The OLT can include an optical transceiver, a non-volatile storage device storing configurations of the pluggable OLT, and an autonomous boot module configured to access the configurations stored in the storage device when booting the pluggable OLT, thereby enabling plug-and-play operations of the pluggable OLT.

16 Claims, 10 Drawing Sheets

(56) References Cited

U.S. PATENT DOCUMENTS

| | | | |
|---|---|---|---|
| 2009/0269051 A1* | 10/2009 | Yoon | H04B 10/40 398/1 |
| 2009/0304384 A1* | 12/2009 | Li | H04J 14/0267 398/58 |
| 2010/0279745 A1* | 11/2010 | Westcott | H04W 52/0274 455/574 |
| 2011/0182588 A1* | 7/2011 | Wojtowicz | H04Q 11/0067 398/139 |
| 2015/0223270 A1* | 8/2015 | Kim | H04W 36/0005 370/329 |
| 2015/0311997 A1* | 10/2015 | Boyd | H04Q 11/0067 398/68 |
| 2016/0050471 A1* | 2/2016 | Boyd | H04Q 11/0067 398/51 |
| 2017/0048892 A1* | 2/2017 | Chen | H04W 52/18 |
| 2017/0104849 A1* | 4/2017 | Mizuno | H04L 67/325 |
| 2019/0065751 A1* | 2/2019 | Srinivas | G06F 9/4401 |
| 2020/0120408 A1* | 4/2020 | Boyd | H04L 41/5054 |

\* cited by examiner

| L2 SWITCHING DOMAIN | ETHERNET CONNECTION | PON CONNECTION | LEARNING | DELETE VLAN DOWN | ADD VLAN UP | MULTICAST BROADCAST LINK | NOTE |
|---|---|---|---|---|---|---|---|
| 1 | S = x, C1 = x, C2 = x | ID = Any, S = x, C1 = x, C2 = x | Y | N | N | 0xFFFE or 0x3FE | VLAN unaware L2 switching from uplink and PON links |

PLUG-AND-PLAY PON SYSTEMS WITH AUTONOMOUS BOOT MODE

RELATED APPLICATION

This application hereby claims priority under 35 U.S.C. § 119 to U.S. Provisional Patent Application No. 62/746,458, filed on 16 Oct. 2018, entitled "Plug and Play PON System with Autonomous Boot Mode," by inventors Edward W. Boyd and Jean-Christophe Marion.

BACKGROUND

Field of the Invention

This disclosure is generally related to passive optical networks (PONs). More specifically, this disclosure is related to a plug-and-play PON transceiver.

Related Art

Passive optical networks (PONs) have become the leading technology for next-generation access networks. Typically, PONs are used in the "first mile" of the network, which provides connectivity between the service provider's central offices and business or residential subscribers. The "first mile" is generally a logical point-to-multipoint network, where a central office serves a number of subscribers. For example, a PON can adopt a tree topology, wherein one trunk fiber couples the central office to a passive optical splitter/combiner. Through a number of branch fibers, the passive optical splitter/combiner divides and distributes downstream optical signals to subscribers and combines upstream optical signals from subscribers (see FIG. 1).

Transmissions within a PON are performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. An ONU can reside either at the curb or at an end-user location, and can provide broadband voice, data, and video services. In recent years, pluggable modules, such as pluggable OLTs and ONUs have been developed.

SUMMARY

One embodiment provides a pluggable optical line terminal (OLT) in a passive optical network (PON). The OLT can include an optical transceiver, a non-volatile storage device storing configurations of the pluggable OLT, and an autonomous boot module configured to access the configurations stored in the storage device when booting the pluggable OLT, thereby enabling plug-and-play operations of the pluggable OLT.

In a variation on this embodiment, the autonomous boot module can be configured to power on the optical transceiver with a random delay.

In a further variation, the autonomous boot module can be further configured to determine an amount of the random delay based on a media access control (MAC) address associated with the pluggable OLT.

In a variation on this embodiment, the pluggable OLT can conform to a standard form factor, and the pluggable OLT can be plugged in to an Ethernet-enabled device.

In a variation on this embodiment, the configurations stored in the non-volatile storage device can include a broadcast link.

In a variation on this embodiment, the configurations stored in the non-volatile storage device can include a virtual local area network (VLAN)-unaware layer 2 switching domain.

In a variation on this embodiment, the configurations stored in the non-volatile storage device can include a default service level agreement (SLA) for the PON.

In a variation on this embodiment, the pluggable OLT can further include an optical network unit (ONU) registration module configured to register ONUs coupled to the pluggable OLT subsequent to the autonomous boot module booting the pluggable OLT without receiving a management message from an external controller.

In a further variation, a respective to-be-registered ONU can be pre-configured with a broadcast link matching a broadcast link stored in the non-volatile storage device of the pluggable OLT.

In a variation on this embodiment, the pluggable OLT can include a management module configured to interface with an external controller to allow the external controller to update the configurations of the pluggable OLT stored in the non-volatile storage device.

BRIEF DESCRIPTION OF THE FIGURES

In the figures, like reference numerals refer to the same figure elements.

DETAILED DESCRIPTION

Overview

Embodiments of the present invention provide a system and method that enables plug-and-play of OLT and ONU modules in the PON system. More specifically, the PON system can include multiple pluggable optical transceivers that can run automatically without management configurations. When operating in an autonomous boot mode, a pluggable OLT module can register ONUs and run PON traffic without receiving PON management messages from an external controller. To avoid power surges on a switch module loaded with many pluggable OLTs, each OLT can be configured to have a random delay when powering on its optical transceiver. Moreover, an external controller can be enabled or disabled upon request to change ONU configurations or check the status of the OLT and ONUs. To enable plug-and-play, the OLT and ONU modules can be pre-configured with a broadcast link. The OLT or ONU configurations can be stored in the non-volatile storage (NVS) module (e.g., a flash storage) on the OLT or ONU, respectively. Moreover, the OLT and ONU can be configured to communicate on a single downstream channel. The OLT can be configured to be VLAN-unaware, leaving the VLAN management to be handled by the device (e.g., an Ethernet switch) hosting the OLT. Similarly, the ONU can be configured to pass all traffic to the hosting device to allow the hosting device to filter the traffic. Various modifications to standard PON operations are also needed. For example, for EPON, the OAM (operations, administration, and maintenance) timeout or deregistration function can be disabled, because OAM is unavailable when the OLT is operating in the autonomous boot mode. Similarly, for GPON, an allocation ID can configure the GPON encapsulation method (GEM) port ID or the XG-PON encapsulation method (XGEM) port ID with the same value automatically, because the ONU management and control interface (OMCI) is not running when the OLT is operating in the autonomous boot mode.

Auto-Configuration of Pluggable OLTs

Figure 1:
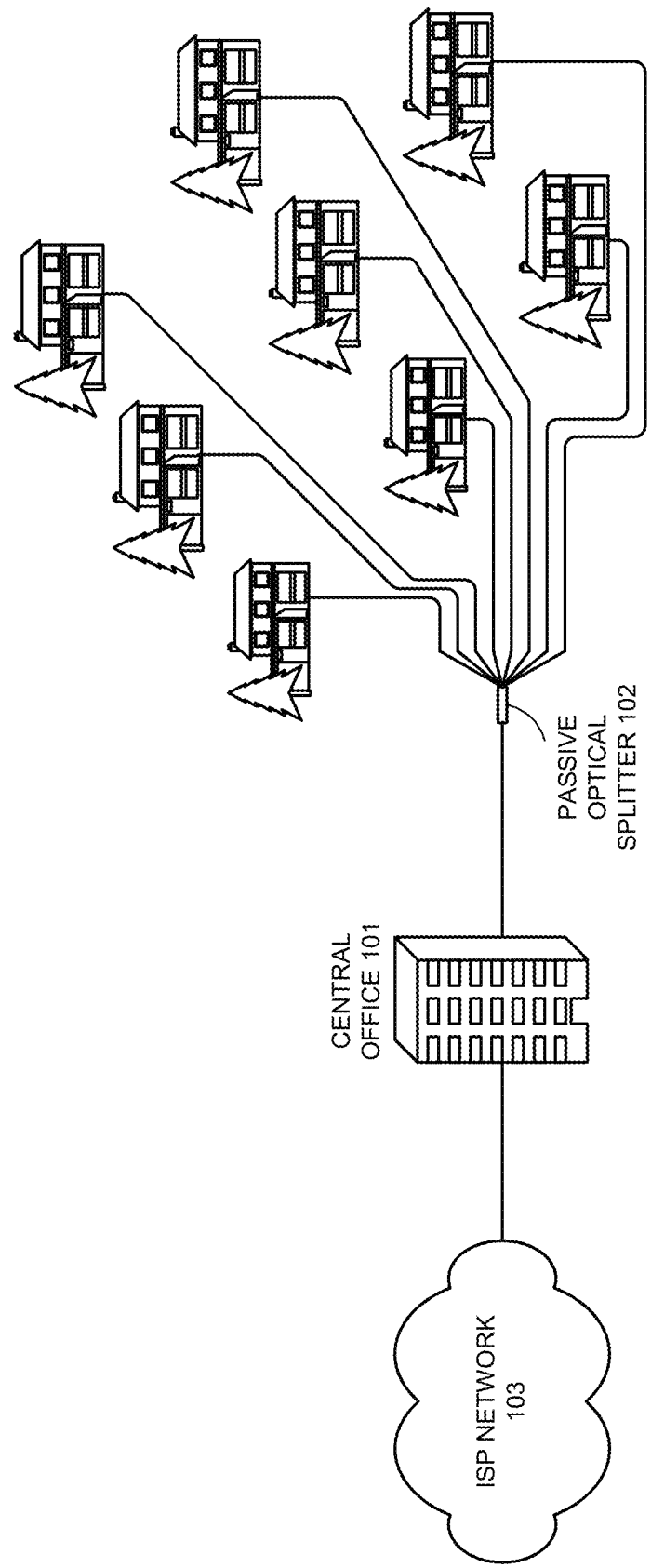
FIG. 1 illustrates a PON including a central office and a number of subscribers coupled through optical fibers and a passive optical splitter (prior art).

FIG. 1 illustrates a PON including a central office and a number of subscribers coupled through optical fibers and a passive optical splitter (prior art). A passive optical splitter 102 and optical fibers couple the subscribers to a central office 101. Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus.

In recent years, pluggable PON modules that conform to standard form factors (e.g., XENPAK, 10 gigabit small form-factor pluggable (XFP), small form-factor pluggable (SFP), enhanced small form-factor pluggable (SFP+), etc.) have been developed. For example, a pluggable OLT module can include an optical transceiver and the OLT media access control (MAC) module and can be plugged into a switch port (e.g., a switch port of standard Ethernet-enabled equipment). Similarly, a pluggable ONU module can include an optical transceiver and the ONU MAC module and can be plugged into an Ethernet-enabled switch port.

Figure 2:
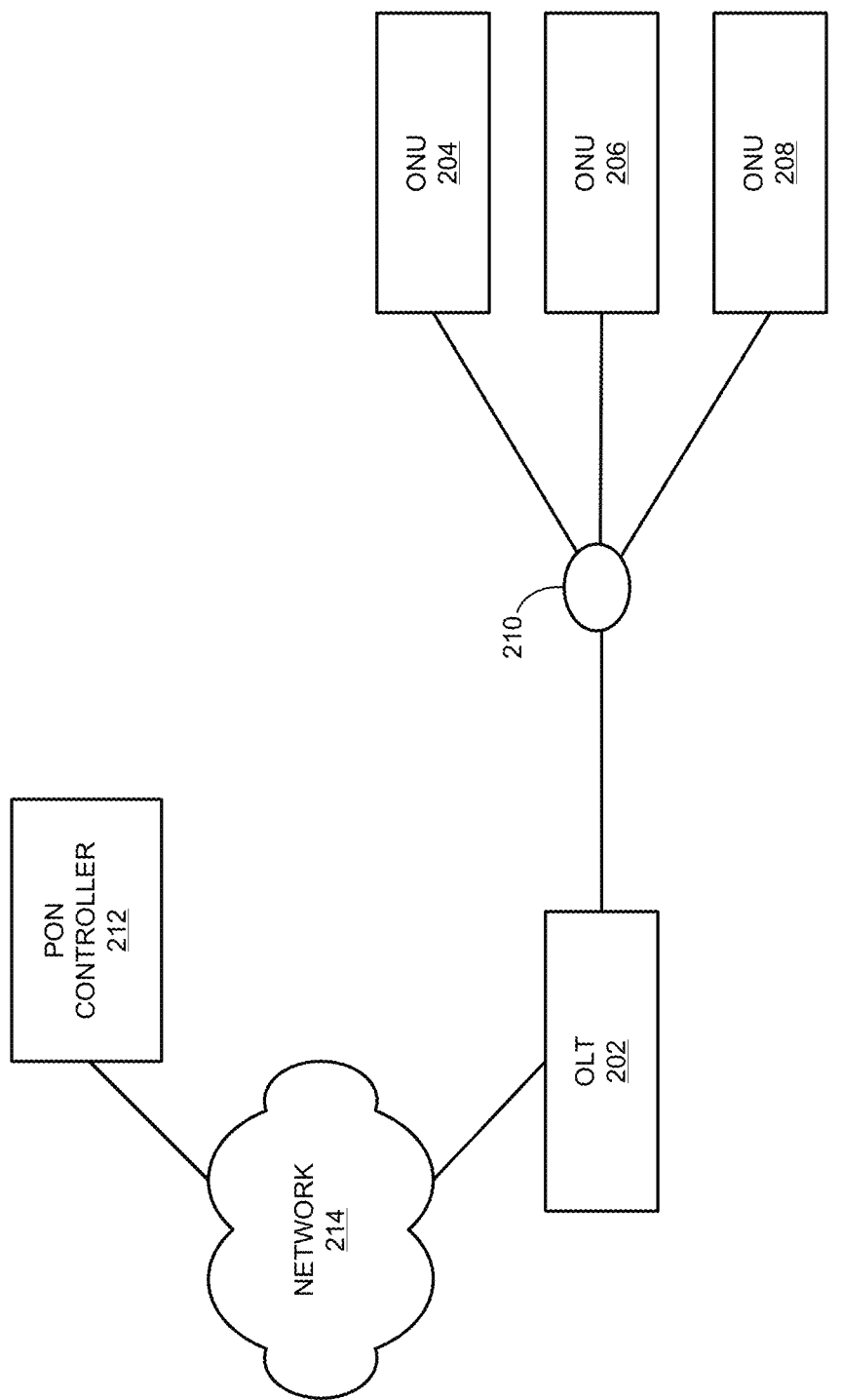
FIG. 2 illustrates an exemplary PON network based on pluggable OLT and ONU modules, according to one embodiment.

FIG. 2 illustrates an exemplary PON network based on pluggable OLT and ONU modules, according to one embodiment. In FIG. 2, PON 200 can include a pluggable OLT 202, which can be coupled to a plurality of pluggable ONUs (e.g., ONUs 204, 206, and 208) via an optical coupler 210. Moreover, pluggable OLT 202 can be coupled to a controller module (e.g., PON controller 212) via a network 214. Pluggable OLT 202 can include an I²C™ interface which can provide registers for the optical module and a port for the initial configuration of the module.

In some embodiments, pluggable OLT 202 and the pluggable ONUs can form an Ethernet PON (EPON) or a Gigabit PON (GPON). Moreover, network 214 can include an Ethernet network. PON controller 212 can be an application running on a standard personal computer (PC) or server. PON controller 212 can communicate with pluggable OLT 202 using Layer 2 operations, administration, and maintenance (OAM) packets.

Before normal operations, pluggable OLT 202 can operate in a managed boot mode, where it boots and then waits for configurations from PON controller 212 before enabling the PON interface. Once the PON interface is enabled, pluggable OLT 202 discovers and registers ONUs (e.g., ONUs 204-208). As the ONUs register with pluggable OLT 202, they are authenticated, configured, and enabled for service using management messages received from PON controller 212. Once the PON is up and running, PON controller 212 continues to monitor the devices (including pluggable OLT 202 and the ONUs) and change configurations as requested.

Figure 3:
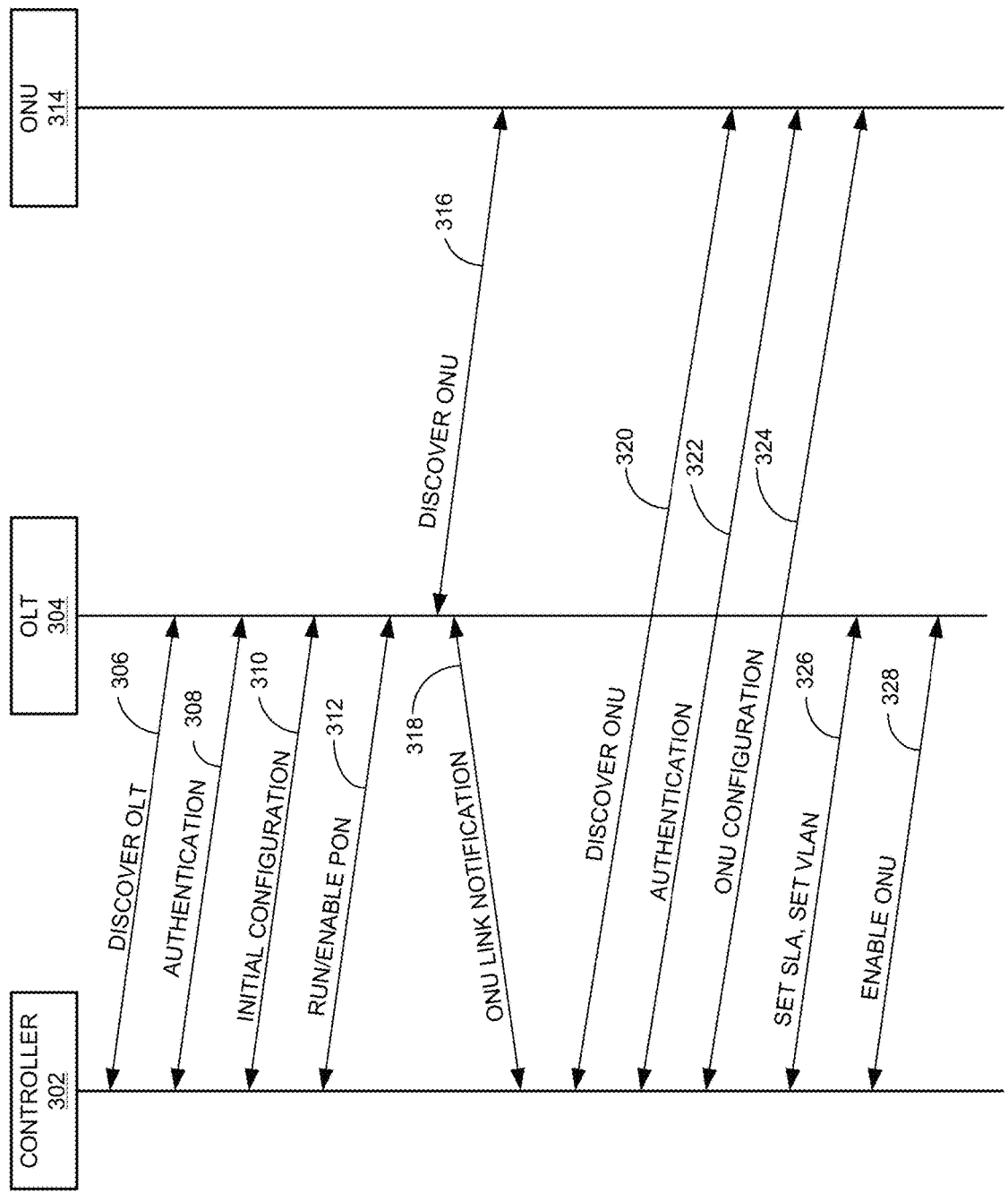
FIG. 3 illustrates an exemplary initialization process of a PON, according to one embodiment.

FIG. 3 illustrates an exemplary initialization process of a PON, according to one embodiment. During operation, controller 302 discovers and authenticates pluggable OLT 304 (operations 306 and 308). Note that, when in the managed boot mode, pluggable OLT 304 can boot and respond to various types of discovery messages (e.g., I²C, link layer discover protocol (LLDP), OAM, etc.). The laser in pluggable OLT 304 does not enable or start the discovery process. Subsequent to being discovered, pluggable OLT 304 receives initial configuration from controller 302 (operation 310) and enables PON interface (operation 312). In some embodiments, the PON interface can be enabled using a default configuration. Moreover, controller 302 can also check the default configuration and set a different configuration before enabling the PON interface.

Subsequent to enabling the PON interface, pluggable OLT 304 can discover ONUs (e.g., ONU 314) coupled to pluggable OLT 304 (operation 316). For example, a standard PON MAC discovery process can be used to discover the ONUs on the PON. Pluggable OLT 304 reports ONU link status to controller 302 (operation 318). At this point, the ONUs are ready to be managed by the controller (e.g., receive OAM messages).

Controller 302 discovers the ONUs and establishes a management channel to the ONUs (operation 320). For EPON, an OAM channel can be established, and the ONU discovery process can involve exchanging OAM messages. On the other hand, for GPON, an ONU management and control interface (OMCI) channel can be established, and the ONU discovery process can involve OMCI messaging. Subsequently, controller 302 authenticates the ONUs (operation 322) and sends ONU configurations (operation 324). Controller 302 can further set the service-level agreement (SLA) and virtual local area network (VLAN) configurations (operation 326) and enables the ONUs (operation 328). Once ONU 314 is enabled, traffic can run between ONU 314 and pluggable OLT 302.

In the example shown in FIG. 3, the PON controller actively manages and configures the pluggable OLTs and ONUs. However, when the pluggable devices are plugged in to an intelligent device (e.g., a carrier switch) on both sides, the need for an intelligent PON device (an OLT or ONU) is often unnecessary. When both the OLT and ONU are part of an internal carrier network, it is often desirable to just provide simple point-to-multipoint connectivity. For example, when the PON is implemented for the backhaul of wireless base stations, there is no need to provide SLAs, thus requiring a very simple configuration. Similarly, the backhaul of a Data Over Cable Service Interface Specification (DOCSIS) network also only requires a simple connectivity, because security is provided at a higher layer. Another example would be LAN networks within a corporation.

When only a simple (sometimes default) configuration is needed to provide the required PON settings, there is no longer the need for an external PON controller to start the service, although such a controller can be enabled temporarily to monitor status or provide configuration changes. In such scenarios, the PON controller can be optional, and the pluggable OLT and ONUs can start and run on default settings.

In some embodiments, the pluggable OLT and ONU can be configured to operate in an autonomous boot mode, which allows for plug-and-play transceiver operations. When the system is operating in the autonomous boot mode, the PON controller is not required for the service to start or continue. However, the PON controller can be used to reconfigure and monitor the PON.

During its booting process, the PON mode, optical overhead, and discovery settings of an OLT module can be set by default settings stored in its personality file or non-volatile storage (NVS). For example, the OLT can store a default Layer 2 switching domain in its personality file or NVS. Once the PON interface is enabled, the ONUs on the PON can be discovered at the PON MAC layer connected to the default Layer 2 switching domain.

When operating in the autonomous boot mode, the pluggable OLT can boot and automatically enable I²C, Ethernet, and PON interfaces. Note that, when many pluggable OLTs are loaded in a switch, the simultaneous start of these transceivers can cause a surge of power from the switch and a drop in the voltage, thus potentially causing a startup failure. When the OLTs are operating in the managed boot mode, as shown in FIG. 3, the controller can enable the many OLTs in a sequential fashion to avoid such a problem. However, when operating in the autonomous boot mode, there is no longer a controller to schedule the turn-on time of the OLTs. To avoid a current spike from a large set of OLTs being turned on at the same time when the OLTs are operating in the autonomous boot mode, the PON interfaces of the OLTs can be enabled with a random delay. More specifically, the random delay can be applied based on the unique MAC address of each pluggable OLT module, thus limiting the number of OLT modules powering their lasers at the same time.

Figure 4:
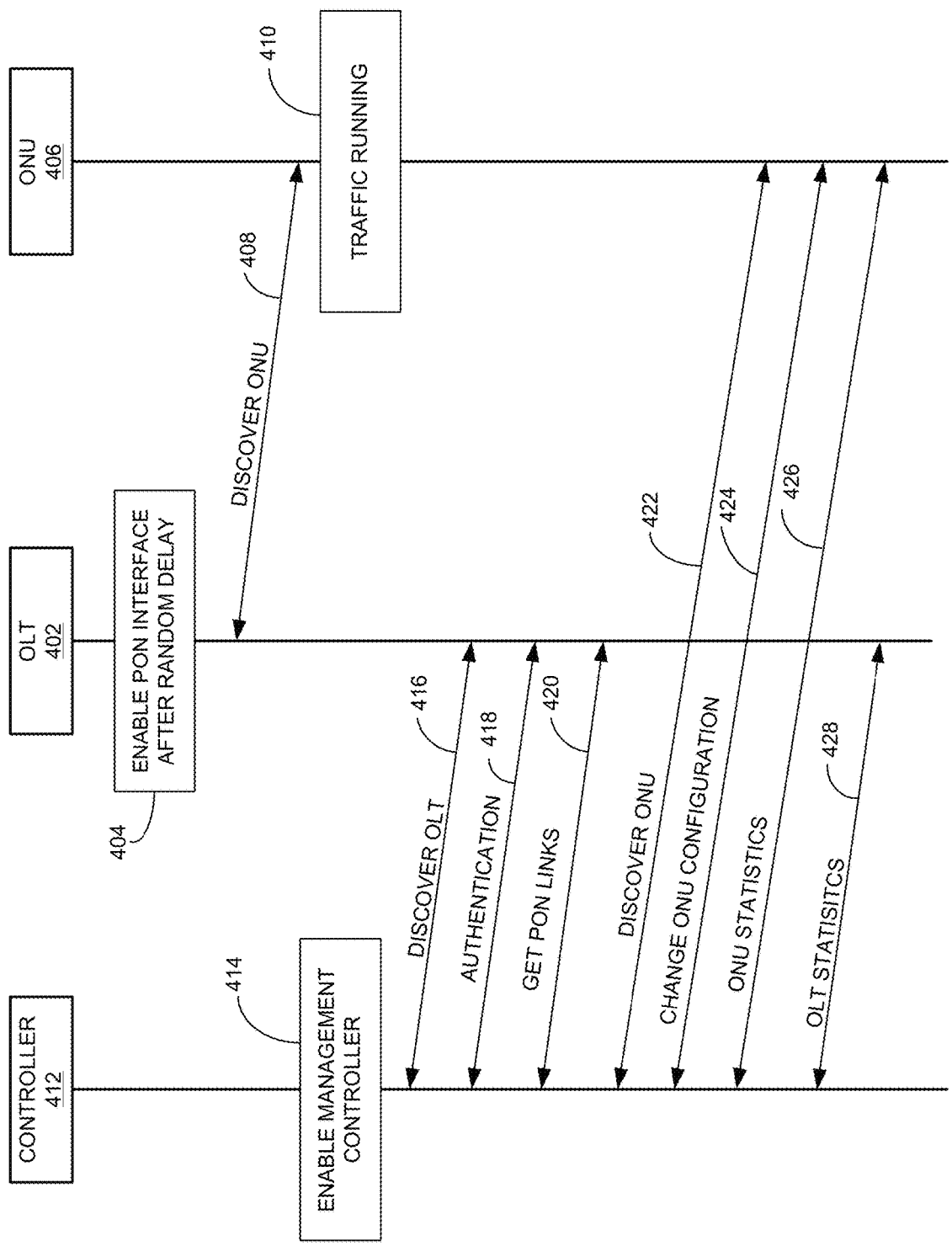
FIG. 4 illustrates an exemplary operation process of a PON, according to one embodiment.

Once the PON interface is enabled, the OLT and ONUs coupled to the OLT can communicate and run traffic without receiving management configuration information from an external controller. On the other hand, the external controller can be enabled to monitor and manage the PON when needed. FIG. 4 illustrates an exemplary operation process of a PON, according to one embodiment.

During operation, a pluggable OLT 402 can operate in the autonomous boot mode. Once booted, subsequent to a random delay, the PON interface on OLT 402 is enabled (operation 404). OLT 402 discovers ONUs (e.g., ONU 406) on the network (operation 408). More specifically, the ONUs can be discovered at the PON MAC layer. In conventional EPONs, an ONU requires exchanges of OAM packets to finish registration. If OAM packets are not received on the ONU, the ONU will be deregistered. To prevent deregistration of ONUs, when the ONUs are configured to operate in the autonomous boot mode, the OAM deregistration function on the ONU is disabled. The ONUs will be enabled and disabled based on the multipoint control protocol (MPCP) registration.

Subsequent to ONU discovery, normal PON traffic can run on the ONUs (operation 410). During normal operations of the PON, a management controller 412 can be enabled (operation 414). Controller 412 can be an application running on a PC or a computer server. Once enabled, controller 412 can discover and authenticates OLT 402 (operations 416 and 418). Controller 412 can receive status information regarding the PON links from OLT 402 (operation 420). Controller 412 can subsequently discover and establish management channels (OAM channels for EPON and OMCI channels for GPON) to the ONUs (operation 422). Consequently, controller 412 can change the configurations of the ONUs (operation 424) and receive ONU statistics (operation 426). Similarly, controller 412 can receive OLT statistics from OLT 402 (operation 428).

Figures 5, 6:
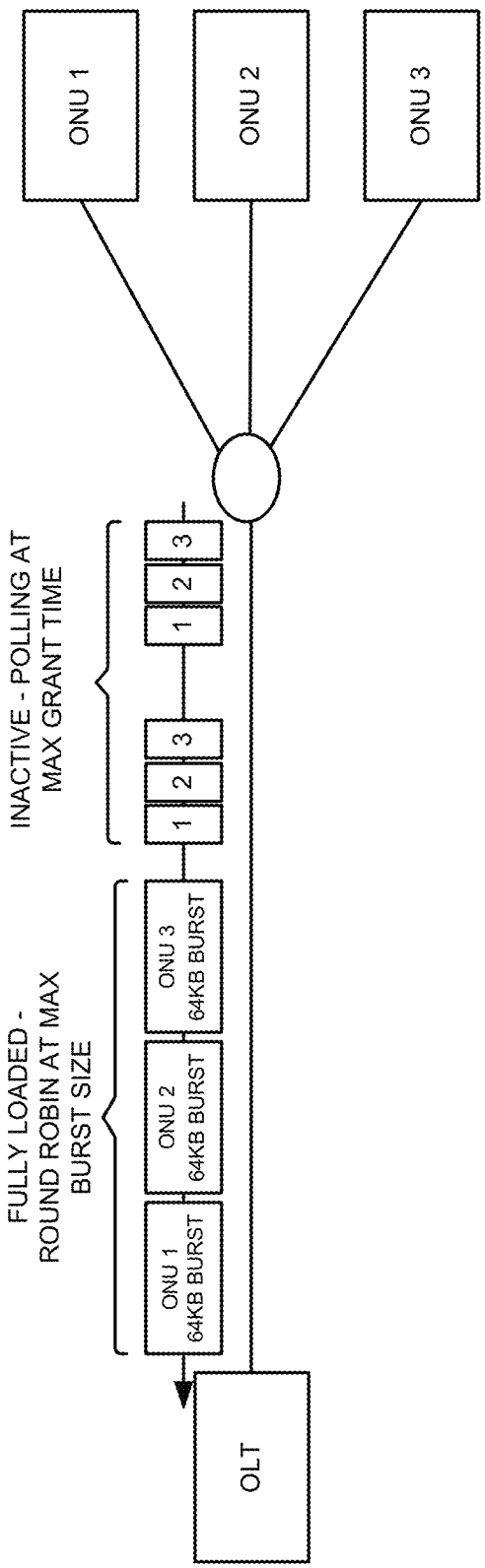
FIG. 5 presents an exemplary default Layer 2 switching configuration of an OLT, according to one embodiment.
FIG. 6 illustrates an exemplary implementation of a default SLA, according to one embodiment.

To enable the plug-and-play operations, the OLTs and ONUs need to be pre-configured in a certain way. The pre-configuration can be stored in the personality file or NVS of each individual OLT or ONU. In some embodiments, an OLT can store a default Layer 2 (L2) switching domain in its personality file or NVS, as shown in FIG. 5. When operating in the autonomous boot mode, registered links on an OLT without a link-specific configuration can be connected to the default L2 switching domain. FIG. 5 presents an exemplary default Layer 2 switching configuration of an OLT, according to one embodiment. The exemplary settings of the default L2 switching domain shown in FIG. 5 can list a single default broadcast link for the OLT. Note that the default values of the broadcast link for the OLT and the ONU must match. In an EPON, the broadcast logical link ID (LLID) can be set as 0xFFFE, whereas in a 10G-PON, the broadcast XG-PON encapsulation method (XGEM) port ID can be set as 0x3FE. Moreover, in autonomous boot mode, it is assumed that VLAN management can be handled by the devices (e.g., switches) hosting the OLTs. Hence, the OLT can be configured to be VLAN-unaware in the downstream (i.e., toward the ONUs), where all traffic to the OLT will be passed downstream. In fact, the common L2 switching configuration of the OLT operating in the autonomous boot mode will include the VLAN-unaware configuration with the default broadcast link.

In an EPON, the downstream links can normally include unicast LLIDs and a broadcast LLID. Normally, traffic from an OLT can be switched to the unicast LLID when it goes to a single LLID and to the broadcast LLID when it goes to more than one ONUs. In the case of multicast traffic, an ONU can filter the traffic based on the Internet Group Management Protocol (IGMP) snooping, Multicast Listener Discovery (MLD) snooping, or a higher layer multicast controller. However, when operating in the autonomous boot mode, a single broadcast LLID can carry all traffic. The OLT is no longer required to switch traffic to the unicast LLIDs. Similarly, when operating in the autonomous boot mode, a pluggable ONU is not required to filter the traffic. The pluggable ONU can pass everything to the switch or hosting device, which can then filter the traffic.

In many scenarios where autonomous boot mode is implemented in the OLTs and ONUs (e.g., in LAN networks within a corporation), a simple SLA is often all that is needed. Such a default SLA can also be stored in the NVS and loaded to the OLT during the booting process. FIG. 6 illustrates an exemplary implementation of a default SLA, according to one embodiment. When operating in the autonomous boot mode, the default SLA for the PON can provide, to each user, a guaranteed bandwidth of 128 Kbps and a best effort bandwidth of 10 Gbps (i.e., full bandwidth is provided). The maximum grant time can be about 2 ms and the grant limit (i.e., the maximum burst size) can be 64K bytes. In the upstream direction, the dynamic bandwidth allocation (DBA) scheduler can grant traffic to ONUs in a round robin fashion with a 2-3 ms maximum delay. In addition to the default SLA, an external controller, once enabled, can override the SLA on a particular link by providing an ONU-specific or link-specific SLA. Once the ONU-specific SLA is stored in or committed to the NVS of the OLT, it can be maintained during boot cycles, such that the stored SLA becomes the default SLA when the OLT is booted.

Figure 7A:
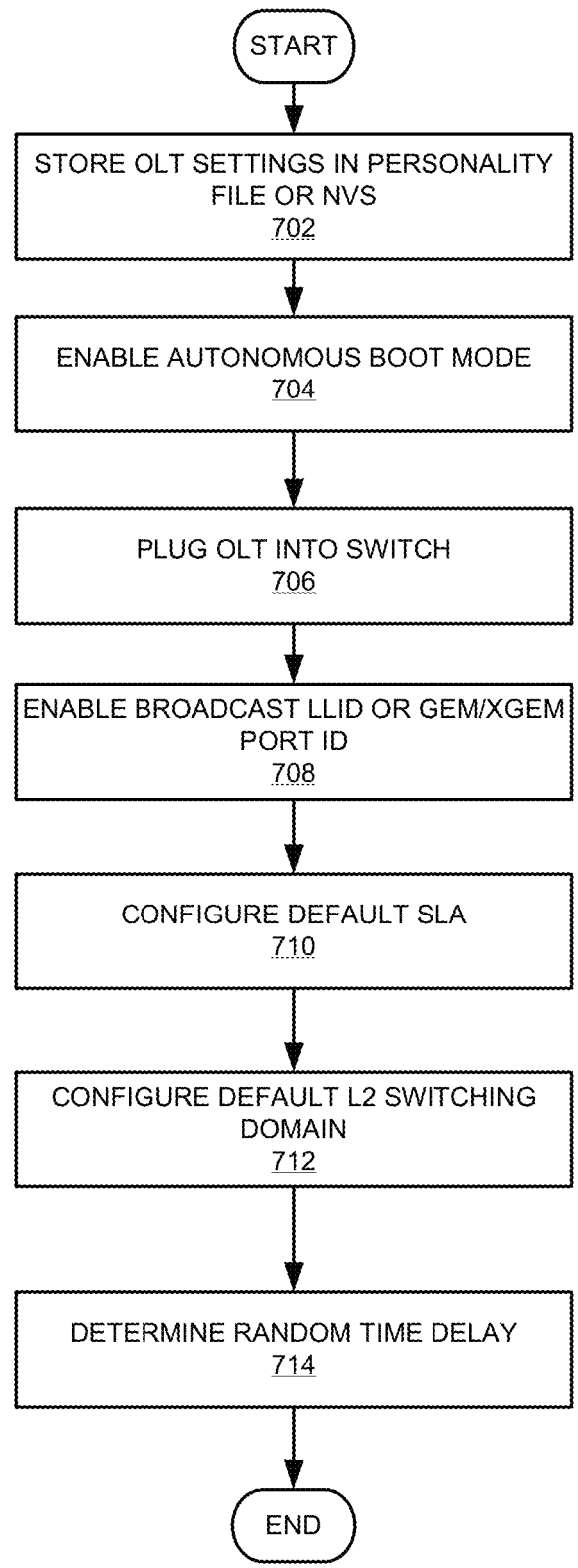
FIG. 7A presents a flowchart illustrating an exemplary OLT configuration process, according to one embodiment.

FIG. 7A presents a flowchart illustrating an exemplary OLT configuration process, according to one embodiment. Prior to being plugged into a network switch (e.g., an Ethernet switch port), the OLT settings can be stored in the personality file or NVS of the OLT (operation 702). Such pre-configuration can be done through the I²C interface on the OLT module. The autonomous boot mode can also be enabled on the OLT (operation 704). Once plugged into the network switch (operation 706), the OLT module starts the booting process by enabling a broadcast LLID (for EPON) or GEM/XGEM port ID (for GPON) with a value that matches the ONU configuration (operation 708). Such a value can be predetermined. For example, the default broadcast LLID for an EPON can be 0xFFFE, whereas the default XGEM port ID for a GPON can be 0x3FE. The matching broadcast LLID or XGEM port ID between the OLT and the ONU allows the OLT to discover the ONUs by broadcasting OAM or OMCI messages on the broadcast channel. Note that, for a conventional GPON, a broadcast or flooding link can be created by an OMCI message. However, when the OLT is operating in the autonomous boot mode, the OMCI is not present. The broadcast link (e.g., the broadcast XGEM port ID) can be the one stored in the NVS (e.g., a flash storage) of the OLT and ONU. The autonomous boot process can further include the OLT configuring a default SLA (operation 710) and configuring the default L2 switching domain (operation 712). Both the default SLA and the default L2 switching domain can be stored in the personality file or the NVS of the OLT. Once the OLT is booted, the PON interface on the OLT can be enabled. Moreover, the autonomous boot process can determine a random time delay (operation 714), which is used to control the turn on time of the optical transceiver within the OLT. In some embodiments, such a random time delay can be determined based on the unique MAC address of the OLT such that there will be a limited number of transceivers being tuned on at the same time, even through the switch is loaded with a large number of OLTs. In further embodiments, the random time delay can be controlled in such a way that only one transceiver is turned on at a given time instant.

In addition to the configuration operations shown in FIG. 7A that are common for both the EPON and GPON OLT modules, a GPON OLT is also needed to configure the default number of allocation IDs for each ONU. The minimum number of allocation IDs is two for each ONU.

Figure 7B:
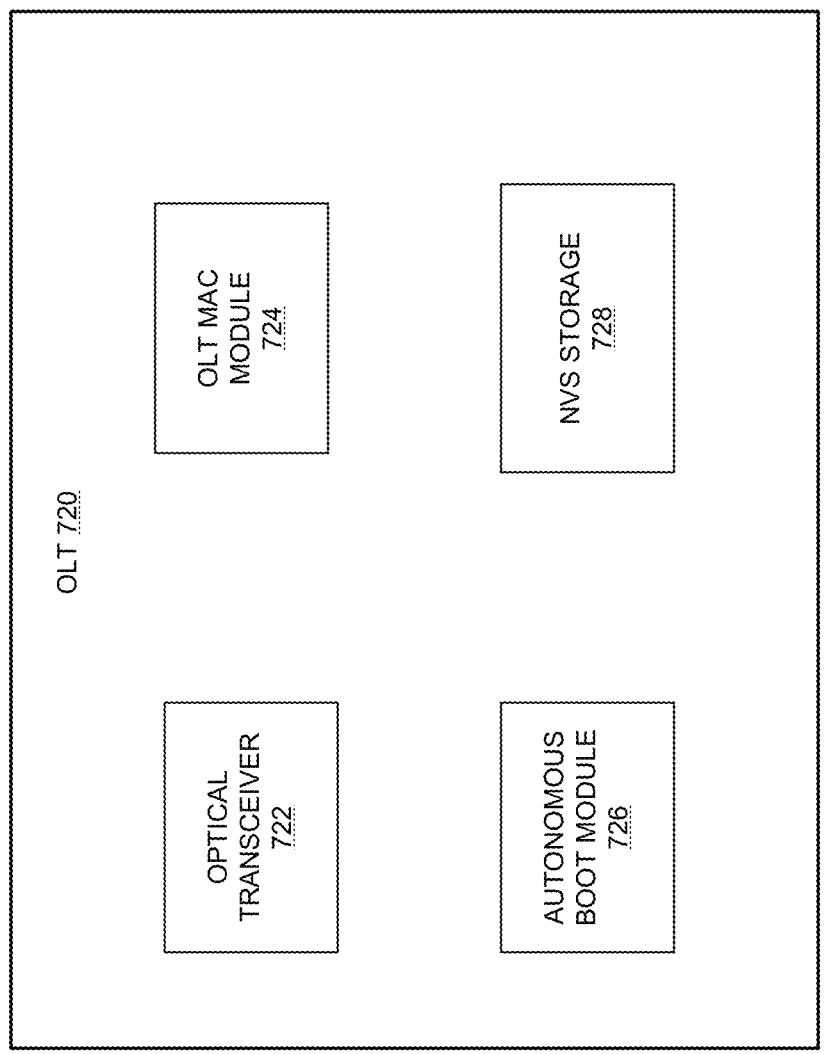
FIG. 7B illustrates the exemplary architecture of an OLT capable of operating in the autonomous boot mode, according to one embodiment.

FIG. 7B illustrates the exemplary architecture of an OLT capable of operating in the autonomous boot mode, according to one embodiment. OLT module 720 can include an optical transceiver 722, an OLT MAC module 724, an autonomous boot module 726, and an NVS storage module 728. Optical transceiver 722 and OLT MAC module 724 can be standard modules found in conventional OLTs. Autonomous boot module 726 can be configured to perform the OLT booting operations. More specifically, autonomous boot module 726 can load the various configurations (e.g., the SLA and the default L2 switching domain) from NVS storage module 728 and use the configurations to configure and enable the PON interface (e.g., optical transceiver 722 and OLT MAC module 724).

Figure 8A:
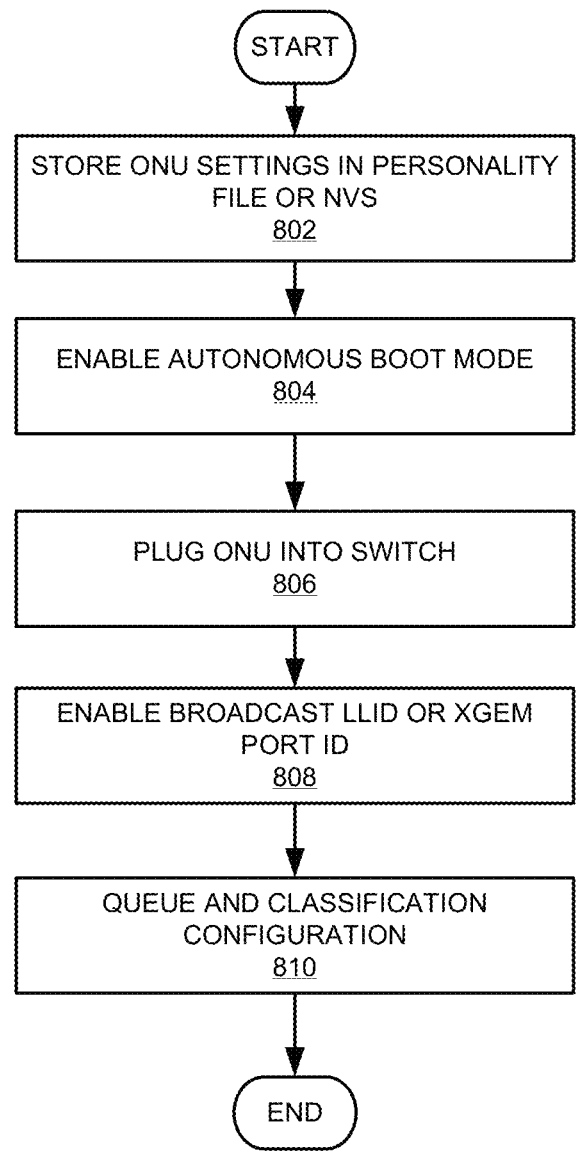
FIG. 8A presents a flowchart illustrating an exemplary ONU configuration process, according to one embodiment.

FIG. 8A presents a flowchart illustrating an exemplary ONU configuration process, according to one embodiment. Prior to being plugged into a network switch (e.g., an Ethernet switch port), the ONU settings can be stored in the personality file or NVS of the ONU (operation 802). The autonomous boot mode can also be enabled on the ONU (operation 804). Once plugged into the network switch (operation 806), the ONU module starts the booting process by enabling a broadcast LLID (for EPON) or XGEM port ID (for GPON) with a value that matches the OLT configuration (operation 808). The ONU booting process can further include the queue and classification configuration (operation 810). Such configurations are the default ONU configurations for the upstream and downstream links.

In addition to the configuration operations shown in FIG. 8A that are common for both the EPON and GPON ONU modules, an EPON ONU operating in the autonomous boot mode also needs to disable the OAM deregistration function and allow the ONUs to be deregistered by MPCP messages only. Moreover, an EPON ONU needs to configure a default number of LLIDs. On the other hand, a GPON ONU needs to enable the auto-creation of the matching XGEM port IDs when the allocation IDs are created.

In conventional GPONs, an OLT can use physical layer OAM (PLOAM) to bring up allocation IDs for data traffic. Subsequent to the creation of the allocation IDs, OMCI packets can be sent to the ONU to configure the user network interface (UNI) port connection in the ONU to the allocation ID. However, when operating in the autonomous boot mode, OMCI management is not available. Moreover, because every ONU needs a unique value, it is impossible to pre-configure the XGEM port ID values. A default assignment of the XGEM port ID matching the allocation ID can be configured when the PLOAM configures the allocation ID. This way, the OLT can assign a unique value for both the allocation ID and the XGEM port ID. The connection of the XGEM port ID to the UNI port and queues can be done by a default configuration stored in the NVS (e.g., a flash storage) of the ONU. The ONU can be configured using the UNI/Queue assignments for the allocation ID/XGEM port in the order they are registered by the OLT. In addition to the upstream XGEM port ID, the same value can be used to create a downstream XGEM port ID.

Figure 8B:
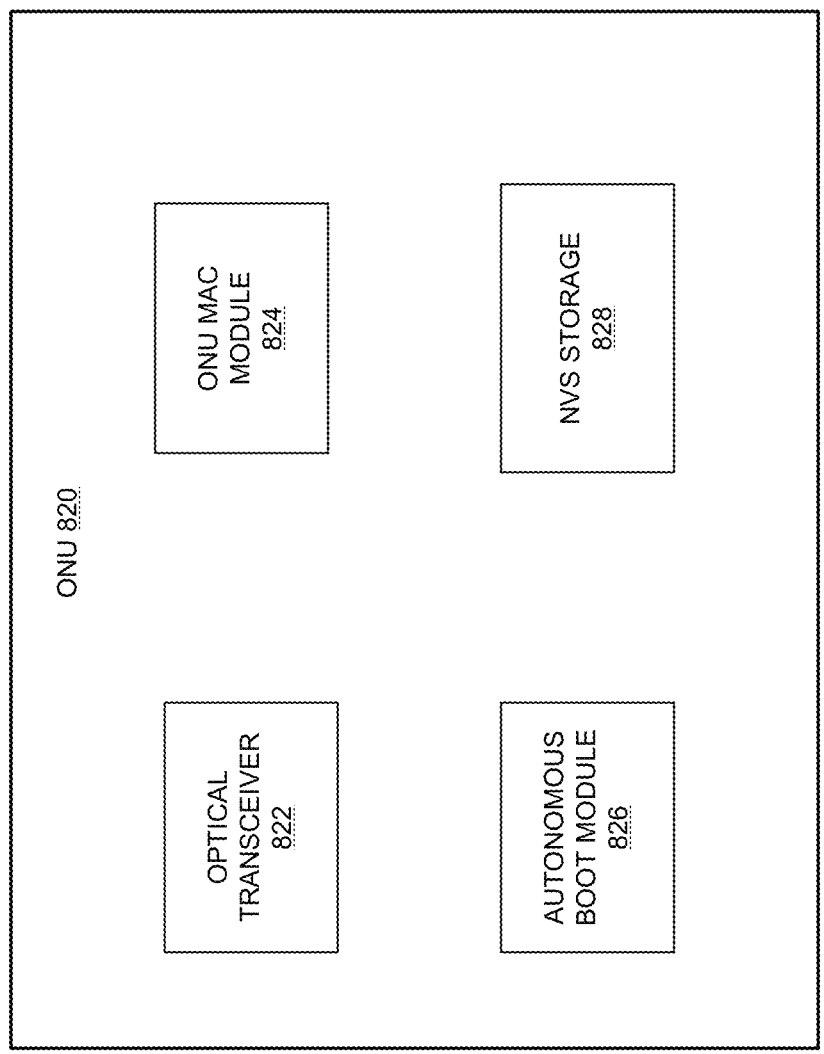
FIG. 8B illustrates the exemplary architecture of an ONU capable of operating in the autonomous boot mode, according to one embodiment.

FIG. 8B illustrates the exemplary architecture of an ONU capable of operating in the autonomous boot mode, according to one embodiment. ONU module 820 can include an optical transceiver 822, an ONU MAC module 824, an autonomous boot module 826, and an NVS storage module 828. Optical transceiver 822 and ONU MAC module 824 can be standard modules found in conventional ONUs. Autonomous boot module 826 can be configured to perform the ONU booting operations. More specifically, autonomous boot module 826 can load the various configurations (e.g., the queue and classification configurations) from NVS storage module 828 and use the configurations to configure and enable the PON interface (e.g., optical transceiver 822 and ONU MAC module 824).

In general, embodiments of the present invention provide a PON system that can include multiple pluggable optical transceivers that can run automatically like a point-to-point or point-to-multipoint transceiver without management configurations. More specifically, the PON system can include a pluggable OLT module that can register ONUs and run PON traffic without receiving PON management messages from an external controller. To avoid power surges on a switch module loaded with many pluggable OLTs, each OLT can be configured to have a random delay when powering on its optical transceivers. Although the external controller is not needed for starting up and running the PON, such a controller can be enabled or disabled upon request to change ONU configurations or check the status of the OLT and ONUs. When operating in autonomous boot mode, the pluggable OLT and ONUs can provide plug-and-play PON connectivity for Ethernet-enabled devices (e.g., an Ethernet switch or router).

Figure 9:
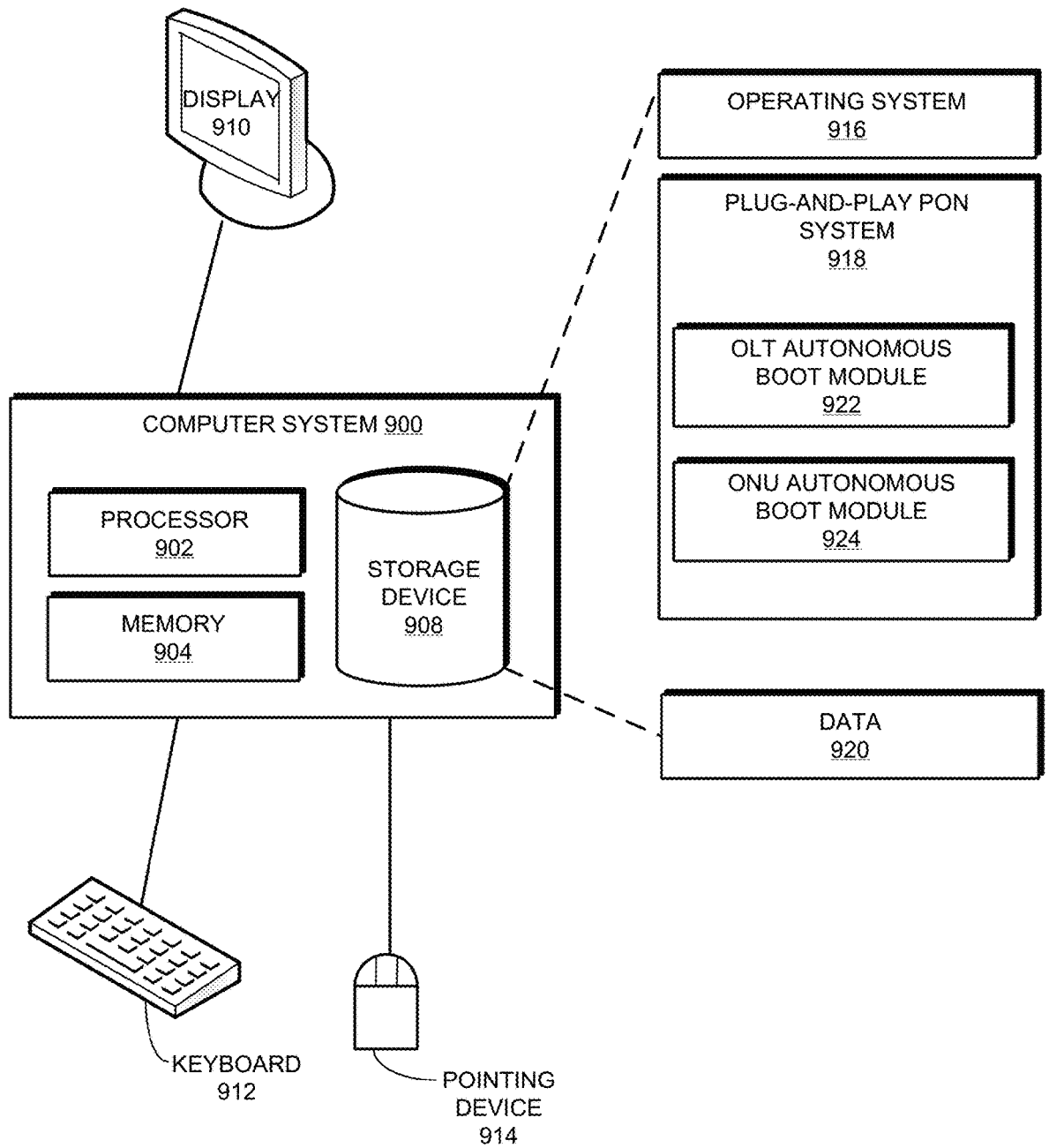
FIG. 9 illustrates an exemplary computer system that facilitates a plug-and-play PON system, according to one embodiment.

FIG. 9 illustrates an exemplary computer system that facilitates a plug-and-play PON system, according to one embodiment. In this example, a computer system 900 includes a processor 902, a memory device 904, and a storage device 908. Furthermore, computer system 900 can be coupled to a display device 910, a keyboard 912, and a pointing device 914. Storage device 908 can store code for an operating system 916, a plug-and-play PON system 918, and data 920.

Plug-and-play PON system 918 can include instructions, which when executed by processor 902 can cause computer system 900 to perform methods and/or processes described in this disclosure. Specifically, plug-and-play PON system 918 can include instructions for implementing an OLT autonomous boot module 922 for enabling the plug-and-play operation of an OLT and an ONU autonomous boot module 924 for enabling the plug-and-play operation of an ONU.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A pluggable optical line terminal (OLT) in a passive optical network (PON), the OLT comprising:
an optical transceiver;
a non-volatile storage device storing configurations of the pluggable OLT; and
an autonomous boot module configured to access the configurations stored in the storage device when booting the pluggable OLT, thereby enabling plug-and-play operations of the pluggable OLT, wherein the autonomous boot module is further configured to power on the optical transceiver with a random delay, and wherein an amount of the random delay is determined based on a media access control (MAC) address associated with the pluggable OLT.

2. The pluggable OLT of claim 1, wherein the pluggable OLT conforms to a standard form factor, and wherein the pluggable OLT is plugged in to an Ethernet-enable device.

3. The pluggable OLT of claim 1, wherein the configurations stored in the non-volatile storage device comprise a broadcast link.

4. The pluggable OLT of claim 1, wherein the configurations stored in the non-volatile storage device comprises a virtual local area network (VLAN)-unaware layer 2 switching domain.

5. The pluggable OLT of claim 1, wherein the configurations stored in the non-volatile storage device comprise a default service-level agreement (SLA) for the PON.

6. The pluggable OLT of claim 1, further comprising an optical network unit (ONU) registration module configured to register ONUs coupled to the pluggable OLT subsequent to the autonomous boot module booting the pluggable OLT without receiving a management message from an external controller.

7. The pluggable OLT of claim 6, wherein a respective to-be-registered ONU is pre-configured with a broadcast link matching a broadcast link stored in the non-volatile storage device of the pluggable OLT.

8. The pluggable OLT of claim 1, further comprising a management module configured to interface with an external controller to allow the external controller to update the configurations of the pluggable OLT stored in the non-volatile storage device.

9. A non-transitory computer-executable method for enabling plug-and-play operations of a pluggable optical line terminal (OLT) in a passive optical network (PON), the method comprising:
pre-configuring the pluggable OLT by storing configurations of the pluggable OLT in a nonvolatile storage device associated with the pluggable OLT; and
booting the pluggable OLT in an autonomous boot mode by accessing the configurations stored in the nonvolatile storage device, thereby enabling the plug-and-play operations of the pluggable OLT;
wherein booting the pluggable OLT in the autonomous boot mode further comprises powering on an optical transceiver associated with the pluggable OLT with a random delay, and wherein an amount of the random delay is determined based on a media access control (MAC) address associated with the pluggable OLT.

10. The non-transitory computer-executable method of claim 9, wherein the pluggable OLT conforms to a standard from factor, and wherein the pluggable OLT is plugged in to an Ethernet-enabled device.

11. The non-transitory computer-executable method of claim 9, wherein the configurations stored in the non-volatile storage device comprise a broadcast link.

12. The non-transitory computer-executable method of claim 9, wherein the configurations stored in the non-volatile storage device comprise a virtual local area network (VLAN)-unaware layer 2 switching domain.

13. The non-transitory computer-executable method of claim 9, wherein the configurations stored in the non-volatile storage device comprises a default service level agreement (SLA) for the PON.

14. The non-transitory computer-executable method of claim 9, further comprising registering ONUs coupled to the pluggable OLT subsequent to the autonomous boot module booting the pluggable OLT without receiving a management message from an external controller.

15. The non-transitory computer-executable method of claim 14, further comprising pre-configuring a respective to-be-registered ONU with a broadcast link matching a broadcast link stored in the non-volatile storage device of the pluggable OLT.

16. The non-transitory computer-executable method of claim 9, further comprising enabling an external controller to allow the external controller to update the configurations of the pluggable OLT stored in the non-volatile storage device.

* * * * *

UNITED STATES PATENT AND TRADEMARK OFFICE
CERTIFICATE OF CORRECTION

PATENT NO. : 10,863,256 B2
APPLICATION NO. : 16/654839
DATED : December 8, 2020
INVENTOR(S) : Edward W. Boyd and Jean-Christophe B. A. Marion It is certified that error appears in the above-identified patent and that said Letters Patent is hereby corrected as shown below:

In the Claims

Claim 2 Column 10 Line 3 should say "enabled"

Claim 4 Column 10 Line 8 should say "comprise"

Signed and Sealed this
Second Day of February, 2021

Drew Hirshfeld
*Performing the Functions and Duties of the
Under Secretary of Commerce for Intellectual Property and
Director of the United States Patent and Trademark Office*